(12) United States Patent
Valentine et al.

(10) Patent No.: US 6,327,267 B1
(45) Date of Patent: Dec. 4, 2001

(54) SYSTEMS AND METHODS FOR ROUTING A MESSAGE THROUGH A SIGNALING NETWORK ASSOCIATED WITH A PUBLIC SWITCHED TELEPHONE NETWORK (PSTN), INCLUDING A METHOD FOR PERFORMING GLOBAL TITLE ROUTING ON AN INTERNET PROTOCOL (IP) ADDRESS

(75) Inventors: Eric Lee Valentine, Plano; Walter Lee Davidson, McKinney, both of TX (US)

(73) Assignee: EricssonInc, Plano, TX (US)

( * ) Notice: Subject to any disclaimer, the term of this patent is extended or adjusted under 35 U.S.C. 154(b) by 0 days.

(21) Appl. No.: 09/217,871

(22) Filed: Dec. 21, 1998

(51) Int. Cl.$^7$ .................................................. H04L 12/66
(52) U.S. Cl. ........................ 370/466; 370/355; 370/385
(58) Field of Search ..................................... 370/352–356, 370/401, 466, 467, 355, 522, 389, 392, 385; 379/229, 230, 88.17

(56) References Cited

U.S. PATENT DOCUMENTS

| | | | |
|---|---|---|---|
| 5,568,475 | * 10/1996 | Doshi et al. ........................... | 370/352 |
| 5,898,839 | * 4/1999 | Berteau . | |
| 6,014,379 | * 1/2000 | White et al. ........................... | 370/389 |
| 6,101,246 | * 8/2000 | Heinmiller et al. .................. | 379/142 |
| 6,134,235 | * 10/2000 | Goldman et al. ..................... | 370/352 |
| 6,178,181 | * 1/2001 | Glitho ................................. | 370/467 |
| 6,185,204 | * 2/2001 | Voit ..................................... | 370/352 |
| 6,195,425 | * 2/2001 | Farris .................................. | 379/230 |
| 6,195,714 | * 2/2001 | Li et al. ................................ | 710/31 |
| 6,208,642 | * 3/2001 | Balachandran et al. ............. | 370/385 |
| 6,208,657 | * 3/2001 | Dendi et al. ......................... | 370/401 |

\* cited by examiner

Primary Examiner—Douglas Olms
Assistant Examiner—Ken Vanderpuye
(74) Attorney, Agent, or Firm—Ericsson Inc.

(57) ABSTRACT

A datagram is received from a packet-switched network at a first network node; the first network node may be a node of the packet-switched network or a node of a signaling network associated with a Public Switched Telephone Network (PSTN). The datagram includes a destination address of a destination node of the signaling network; the destination address has an address format associated with the packet-switched network, such as that defined by the Internet Protocol. A message is constructed for transmission from the first network node to a node of the signaling network; the message includes an address field containing the destination address and a translation type field containing an indicator that the destination address has an address format associated with the packet-switched network. The message is transmitted to a signaling network node, at which the translation type field of the message is examined and, if the indicator in the translation type field corresponds to the address format associated with the packet-switched network, the destination address is translated to a translated destination address corresponding to the destination node of the signaling network; the translated destination address has an address format defined by the signaling network protocol. The signaling network node may be the destination node. The systems and methods can be used to perform global title routing in the signaling network associated with the PSTN based on an Internet Protocol (IP) address associated with the packet-switched network.

32 Claims, 3 Drawing Sheets

IP Address: 208.162.106.17

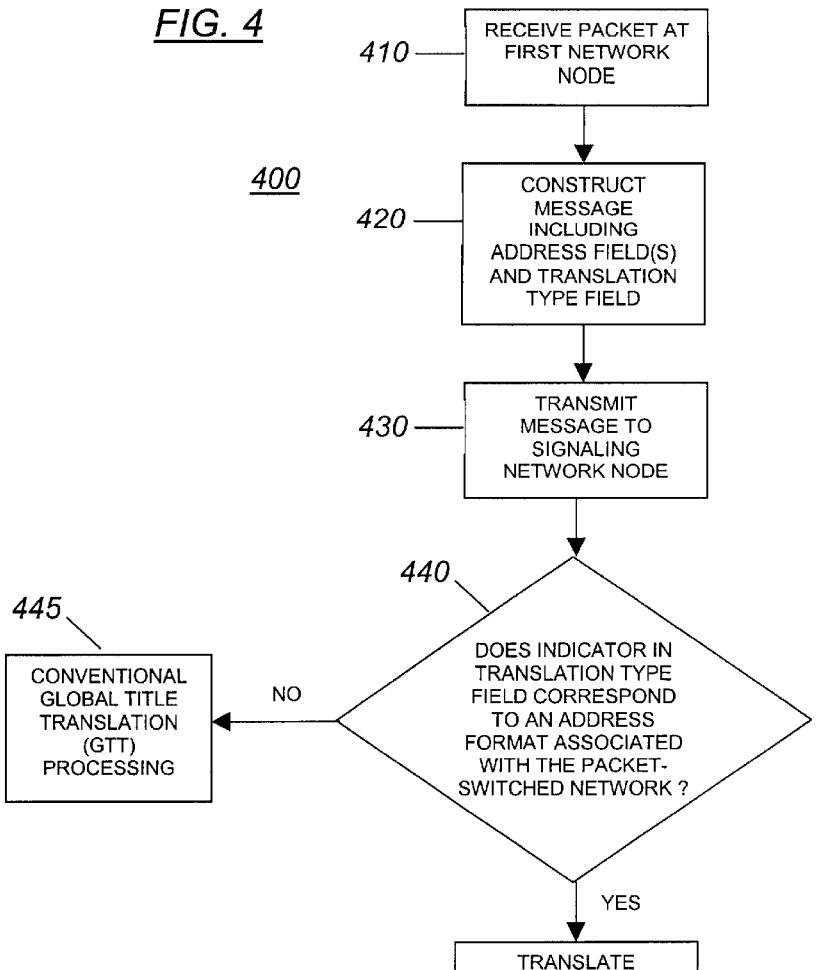
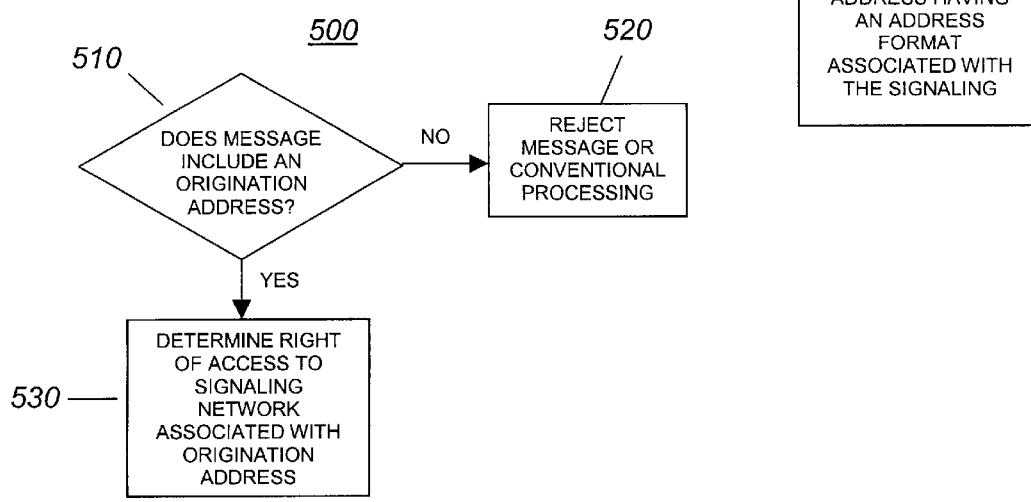

SYSTEMS AND METHODS FOR ROUTING A MESSAGE THROUGH A SIGNALING NETWORK ASSOCIATED WITH A PUBLIC SWITCHED TELEPHONE NETWORK (PSTN), INCLUDING A METHOD FOR PERFORMING GLOBAL TITLE ROUTING ON AN INTERNET PROTOCOL (IP) ADDRESS

TECHNICAL FIELD OF THE INVENTION

The present invention is directed, in general, to communications systems and, more specifically, to systems and methods for routing a message through a signaling network associated with a Public Switched Telephone Network (PSTN), including a method for performing global title routing on an Internet Protocol (IP) address.

BACKGROUND OF THE INVENTION

The world is currently experiencing revolutionary changes in communications systems, brought about by the general availability of access to the Internet as well as the evolution of wireless telephony and Intelligent Network (IN) service enhancements to the Public Switched Telephone Network (PSTN). In particular, interest in Internet Protocol (IP) telephony, or Voice over IP (VoIP), has expanded rapidly as the associated technologies have matured. Improved interoperability is a critical factor to further enhancements in such communications systems, particularly telephony services provided by such systems.

The advent of IP telephony allowing phone calls across packet-switched networks triggered a revolution in the telecommunications industry. Early IP telephony, however, had many limitations that prevented it from becoming a mainstream telephony service. One of the biggest problems was a lack of connectivity between an IP telephony network and the public switched telephone network (PSTN). This led to the development of a gateway that allows IP and PSTN customers to communicate with each other. Differences in the protocols used by the Internet and PSTN, however, have required the development of novel solutions to resolve problems of interoperability between the networks.

Associated with the North American PSTN is a signaling network that employs the Common Channel Signaling System 7 (SS7) to exchange signaling messages between network elements, or "nodes." Every network must have an addressing scheme, and the SS7 network is no different. Network addresses are required so that a node can exchange signaling messages with nodes to which it does not have a physical signaling link. In SS7, addresses are assigned using a three-level hierarchy. Individual signaling points are identified as belonging to a "cluster" of signaling points. With each cluster, each signaling point is assigned a "member" number. Similarly, a cluster is defined as being part of a "network." Any node in the American SS7 signaling network can be addressed by a three-level number, or "point code," defined by its network, cluster and member numbers; each of these numbers is an 8-bit number and can assume values from 0 to 255. A signaling message is transmitted from an originating signaling point, identified by an "origination if point code" (OPC), to a destination signaling point, identified by a "destination point code" (DPC).

Packet-switched networks which use the Internet Protocol (IP), such as the Internet, use an address format that is unlike the three-level point codes used in the North American SS7 signaling network. According to the Internet Protocol Version 4 (IPv4), the addresses of network nodes are always 32 bits in length, and are typically written as a sequence of four numbers representing the decimal value of each of the address bytes. Because of differences in the addressing protocols employed in the PSTN signaling network (e.g. SS7) and other packet-switched networks, such as the Internet, interoperability between the networks can be limited. With the proliferation of IP telephony devices and other Internet applications, however, it is desirable to provide access to certain resources generally only available through the PSTN signaling network. For example, an Internet telephony device could benefit from access to "800" number databases, Service Data Points (SDPs) and Home Location Registers (HLRs) coupled to the PSTN signaling network, as well as Intelligent Network (IN) services available through the PSTN signaling network. Furthermore, the PSTN signaling network might be used when alternate routing of messages is needed, such as in the case of Local Area Network (LAN) or Wide Area Network (WAN) crashes. Because of the proliferation of IP telephony devices and services, and the desire to provide Intelligent Network (IN) services to telephony devices coupled to packet-switched networks, such as the Internet, there is a need in the art for systems and methods for routing a message from a packet-switched network through a signaling network associated with a Public Switched Telephone Network (PSTN).

SUMMARY OF THE INVENTION

To address the above-discussed deficiencies of the prior art, the present invention provides systems and methods for routing a message through a signaling network associated with a public switched telephone network (PSTN), including a method for performing global title routing on an Internet Protocol (IP) address.

In one embodiment, a datagram is received at a first network node. The datagram includes a destination address of a destination node on a signaling network associated with a Public Switched Telephone Network (PSTN); the destination address has an address format associated with a packet-switched network, such as that defined by the Internet Protocol. A message is constructed for transmission from the first network node to a signaling network node; the message includes an address field containing the destination address and a translation type field containing an indicator that the destination address has an address format associated with the packet-switched network. The message is transmitted to the signaling network node, at which the translation type field of the message is examined and, if the indicator in the translation type field corresponds to the address format associated with the packet-switched network, the destination address is translated to a translated destination address corresponding to the destination node of the signaling network; the translated destination address has an address format defined by the signaling network protocol. The second node can be, but is not necessarily, the destination node.

The address type associated with the packet-switched network can be an Internet Protocol (IP) address. Alternatively, the address type may be a Media Access Control (MAC) address. Those skilled in the art will recognize that the principles of the present invention can be used to advantage with any address type not conventionally used by the signaling network.

In the embodiments described herein, the signaling network associated with the PSTN is an out-of-band common channel system; e.g., a system conforming to the Signaling System Number 7 (SS7/C7) standard. The principles disclosed, however, may be adapted to other networks that rely on addressing protocols that include a destination address field and associated address type field.

In some embodiments, the datagram can also include an origination address of a node of the packet-switched network from which the datagram originated. In a related embodiment, a right of access to the signaling network associated with the PSTN is determined as a function of the origination address. Restricting access to the signaling network may be necessary to prevent malicious activity by unauthorized users.

Systems for routing messages through a signaling network associated with a PSTN, according to the principles disclosed herein, include a first network node for receiving a datagram, wherein the datagram includes a destination address of a destination node of the signaling network having an address format associated with the packet-switched network. The first network node may be on the packet-switched network or the signaling network. In a SS7 signaling network, the first network node can be a Signal Transfer Point (STP). The first network node constructs a message including an address field containing the destination address and a translation type field containing an indicator that the destination address has the address format associated with the packet-switched network. The first network node then transmits the message to a signaling network node. The system can also include the signaling network node that receives the message and, if the indicator in the translation type field of the message corresponds to the address format associated with the packet-switched network, the signaling network node translates the destination address to a translated destination address corresponding to a destination node of the signaling network; the translated destination address has an address format associated with the signaling network. Any of the network nodes can also determine a right of access to the signaling network as a function of an origination address associated with the node of the packet-switched network from which the datagram originated.

A method for performing global title routing on an Internet Protocol (IP) address, whereby an IP packet can be routed through a signaling network associated with a PSTN, is also disclosed as a specific application of the principles disclosed herein. In such embodiments, an IP packet is received at a first network node; the IP packet includes a destination IP address associated with a destination node of the signaling network. A message is constructed for transmission from the first network node to a signaling network node, wherein the message includes an address field containing the destination IP address associated with the destination node. The message is then transmitted from the first network node to the signaling network node, where the destination IP address is translated to a translated destination address corresponding to the destination node of the signaling network. The translated destination address has an address format associated with the signaling network, such as a destination point code (DPC).

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which:

FIG. 4 illustrates an exemplary flowchart of a conventional GTT process adapted to employ the principles of the present invention;

FIG. 5 illustrates an exemplary method for determining a right of access to a signaling network associated with a PSTN.

DETAILED DESCRIPTION

In order to better understand the features and advantages of the present invention, the basic structure and capabilities of the signaling network associated with the Public Switched Telephone Network (PSTN), and the Internet Protocol associated with many packet-switched networks such as the Internet, are first described.

Associated with the North American PSTN is a signaling network that employs the Common Channel Signaling System 7 (SS7) to exchange signaling messages between network elements, or "nodes." SS7 is a global standard for telecommunications defined by the International Telecommunications Union (ITU) Telecommunications Standardization Sector (ITU-T). The standard defines the procedures and protocol by which network elements, or nodes, in the Public Switched Telephone Network (PSTN) exchange information over a digital signaling network to effect wireless (e.g., cellular) and wireline call setup, routing and control. The ITU definition of SS7 allows for national variants such as the American National Standards Institute (ANSI) and Bell Communications Research (Bellcore) standards used in North America and the European Telecommunications Standards Institute (ETSI) standard used in Europe. The SS7 network and protocol are used for i) basic call setup, management, and tear down: ii) wireless services such as personal communications services (PCS), wireless roaming, and mobile subscriber authentication; iii) local number portability (LNP); toll-free (800/888) and toll (900) services; iv) enhanced call features such as call forwarding, calling party name/number display, and three-way calling; and v) efficient and secure worldwide communications.

Figure 1:
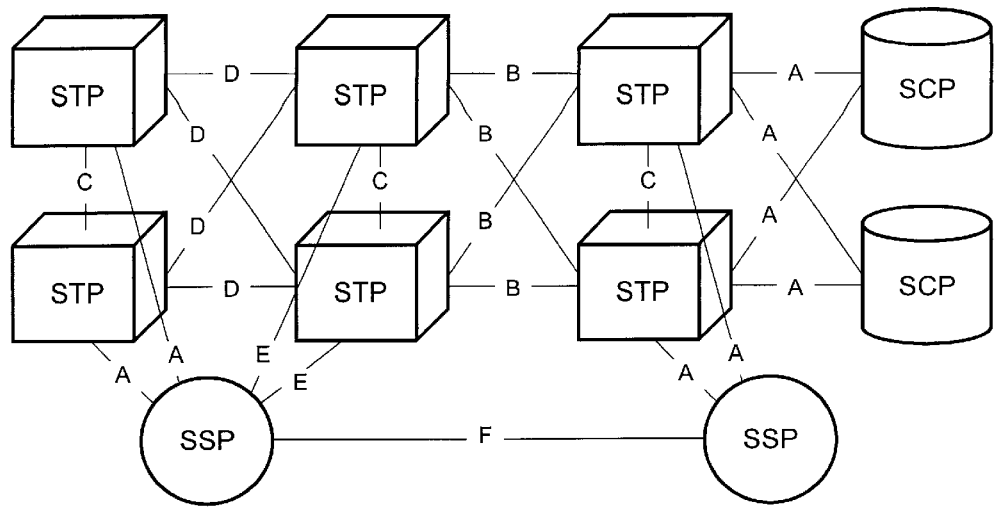
FIG. 1 illustrates various signaling points, or network elements, and signaling link types of an SS7 network.

Referring to FIG. 1, illustrated are the various signaling points, or network elements, and signaling link types of an SS7 network. SS7 messages are exchanged between network elements, or nodes, over bi-directional channels called signaling links. Signaling occurs out-of-band on dedicated channels rather than in-band on voice channels. Compared to in-band signaling using multi-frequency (MF) signaling tones, out-of-band signaling provides faster call setup times, more efficient use of voice circuits, support for Intelligent Network (IN) services which require signaling to network elements without voice trunks (e.g., database systems), and improved control over fraudulent network usage. Each network node, or signaling point, in the SS7 network is uniquely identified by a numeric point code. Point codes are carried in signaling messages exchanged between signaling points to identify the source and destination of each message; a message source has an Originating Point Code (OPC) and the destination of the message is identified by a Destination Point Code (DPC). Each signaling point uses a routing table to select the appropriate signaling path for each message.

As shown in FIG. 1, there are three kinds of signaling points in an SS7 network; Service Switching Points (SSPs), Signal Transfer Points (STPs) and Service Control Points (SCPs). SSPs are switches that originate, terminate, or tandem calls. An SSP sends signaling messages to other SSPs to setup, manage, and release voice circuits required to complete a call. An SSP may also send a query message to a centralized database (e.g., an SCP) to determine how to route a call (e.g., a toll-free 800/888 call in North America). An SCP sends a response to the originating SSP containing the routing number(s) associated with the dialed number. An alternate routing number may be used by the SSP if the primary number is busy or the call is unanswered within a specified time. Actual call features vary from network to network and from service to service.

Network traffic between signaling points may be routed via a packet switch called an STP. An STP routes each incoming message to an outgoing signaling link based on routing information contained in the SS7 message. Because it acts as a network hub, an STP provides improved utilization of the SS7 network by eliminating the need for direct links between all signaling points. An STP may also perform Global Title Translation (GTT), which is a procedure by which the DPC of the destination signaling point is determined from information present in the signaling message (e.g., the dialed 800 number, calling card number, or mobile subscriber identification number). An STP can also act as a "firewall" to screen SS7 messages exchanged with other networks.

Because the SS7 network is critical to call processing, SCPs and STPs are usually deployed in mated pair configurations in separate physical locations to ensure network wide service in the event of an isolated failure. Links between signaling points are also provisioned in pairs, often referred to as a "linkset." Traffic is shared across all links in a linkset; if one of the links fails, the signaling traffic is rerouted over another link in the linkset. The SS7 protocol provides both error correction and retransmission capabilities to allow continued service in the event of signaling point or link failures.

Signaling links are logically organized by link type, identified in FIG. 1 as "A" through "F," according to their use in the SS7 signaling network. An access, or "A," link connects a signaling end point (e.g., an SCP or SSP) to an STP; only messages originating from or destined to the signaling end point are transmitted on an "A" link. A bridge, or "B," link connects an STP to another STP. Typically, a quad of "B" links interconnect peer (or primary) STPs (e.g., the STPs from one network to the STPs of another network). The distinction between a "B" link and a "D" link (described hereinafter) is rather arbitrary; for this reason, such links may be referred to as "B/D" links. A cross, or "C," link connects STPs performing identical functions into a mated pair. A "C" link is used only when an STP has no other route available to a destination signaling point due to link failure (s). SCPs may also be deployed in pairs to improve reliability; unlike STPs, however, mated SCPs are not interconnected by signaling links. A diagonal, or "D," link connects a secondary (e.g., local or regional) STP pair to a primary (e.g., inter-network gateway) STP pair in a quad-link configuration. Secondary STPs within the same network are connected via a quad of "D" links. An extended, or "E," link connects an SSP to an alternate STP. "E" links provide an alternate signaling path if an SSPs "home" STP cannot be reached via an "A" link. "E" links are not usually provisioned unless the benefit of a marginally higher degree of reliability justifies the additional expense. Lastly, a fully associated, or "F," link connects two signaling end points (i.e., SSPs and SCPs).

Every network must have an addressing scheme, and the SS7 network is no different. Network addresses are required so that a node can exchange signaling messages with nodes to which it does not have a physical signaling link. In SS7, addresses are assigned using a three-level hierarchy. Individual signaling points are identified as belonging to a "cluster" of signaling points. With each cluster, each signaling point is assigned a "member" number. Similarly, a cluster is defined as being part of a "network." Any node in the American SS7 signaling network can be addressed by a three-level number, or "point code," defined by its network, cluster and member numbers; each of these numbers is an 8-bit number and can assume values from 0 to 255. A signaling message is transmitted from an originating signaling point, identified by an "origination point code" (OPC), to a destination signaling point, identified by a "destination point code" (DPC).

Outside of the signaling network associated with the PSTN, i.e., an SS7 network, the addressing scheme of many packet-switched networks, such as the Internet, is based on the Internet Protocol (IP), which is defined within a set of standards developed by the Internet Engineering Task Force (IETF). IP provides services that are generally equivalent to the OSI Network Layer. Of particular interest to the invention disclosed herein is the addressing and routing of IP packets. An IP address is used to route datagrams (or packets) between computers, or generally "nodes". The IP address of a node is not the node's physical address, which is a Media Access Control (MAC) address, but provides a means to define the logical location of the node within a network. A Media Access Control (MAC) address is a hardware address that uniquely identifies each node of a network; in the Open Systems Interconnect (OSI) reference model, a Data Link Control (DLC) layer includes a MAC sub-layer, which interfaces directly with the network media.

The topographies of packet-switched networks, such as Local Area Networks (LANs), Wide Area Networks (WANs) and the Internet, are well known. Computers on such networks can typically be addressed either on the MAC level, or using an IP address which at some point is converted to a MAC address. It is not practical for all computers within a large network, such as the Internet, however, to know the MAC addresses for every computer connected to the network. Therefore, an addressing and routing scheme was developed which uses logical "IP" addresses to route a packet until it reaches a point in the network where a final conversion to a MAC address is performed. Communications between two different networks, such as a LAN and a WAN, can also be performed by "routers" using such IP addresses.

Figure 2:
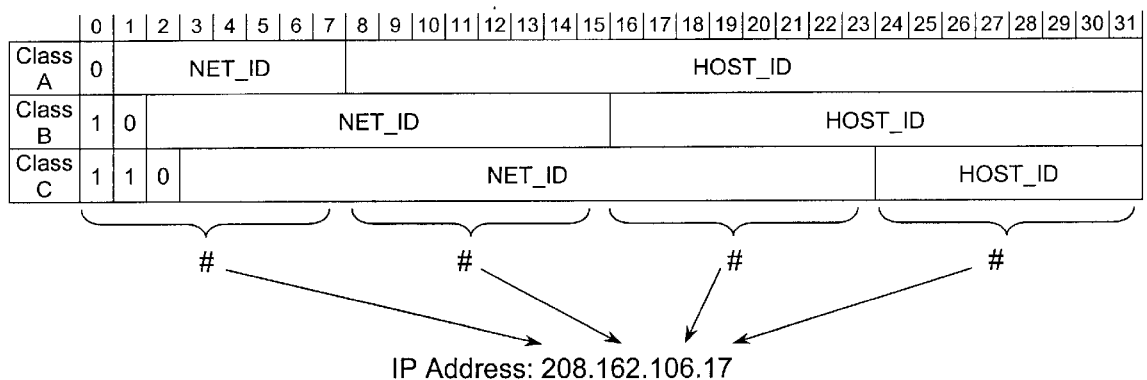
FIG. 2 illustrates a conventional format of an IP address.

The Internet is a packet-switched network, which employs a Transport Control Protocol/Internet Protocol (TCP/IP) stack, or simply Internet Protocol (IP) suite. Packet-switched networks, however, may also include private and public local area networks (LANs), wide-area networks (WANs), and point-to-point dial-up connections over point-to-point protocol (PPP) or other packet-switched protocols. Packet-switched networks which use the Internet Protocol (IP) use an address format that is unlike the three-level point codes used in the North American SS7 signaling network. FIG. 2 illustrates the conventional format of IP addresses. According to the Internet Protocol Version 4 (IPv4), the addresses of network nodes are always 32 bits in length, and are typically written as a sequence of four numbers, representing the decimal value of each of the address bytes; because the values are conventionally separated by periods, e.g., 208.162.106.17, the notation is often referred to as "dotted decimal."

Like SS7 addresses, IP addresses are hierarchical for routing purposes. IP addresses are generally divided into two subfields, a Network Identifier (NET_ID) subfield and a Host Identifier (HOST_ID) subfield. The NET_ID subfield identifies a TCP/IP subnetwork connected to the Internet, and is used for high-level routing between networks, much the same way as the country code, city code, or area code is used in the PSTN. The $HOST_{13}$ ID subfield indicates a specific host with a subnetwork.

Different classes of IP addresses for hosts are defined, and differ in the number of bits allocated to the NET_ID and HOST_ID subfields. The different numbers of bits allocated to the subfields defines how many hosts can be addressed; a Class A address has a 7-bit NET_ID and 24-bit HOST_ID, and can address up to 16,777,216 ($2^{24}$) hosts per network; a Class B address has a 14-bit NET_ID and 16-bit HOST_ID, and can address up to 65,536 ($2^{16}$) hosts per network; and a Class C address has a 21-bit NET_ID and 8-bit HOST_ID, and ran only address up to 256 ($2^8$) hosts per network. Upon the acceptance and implementation of Internet Protocol Version 6 (IPv6), the IP address size will increase to 128 bits, thus greatly increasing the number of addressable hosts demanded due to the tremendous growth of the Internet.

The relaying of packets through a packet-switched network is handled by routers. A router receives data packets and examines the address field; if the packet is destined for another network not coupled to the router, a routing table is examined to determine how to route the packet to its destination. If the packet is destined for a network coupled to the router, a deeper analysis is performed in order to direct the packet toward the correct host on the network.

Having generally described the addressing schemes for a conventional signaling it network, such as the SS7, associated with a PSTN, and for a packet-switched network such as the Internet, the novel principles of the present invention can be described. As noted previously, the proliferation of IP telephony devices and other Internet applications or services makes it desirable to provide Internet access to certain resources generally only available through the PSTN signaling network. The present invention addresses that desire and provides systems and methods for routing a message from a packet-switched network, such as the Internet, through a signaling network, such as the SS7, associated with a Public Switched Telephone Network (PSTN).

The hardware and software functions of the SS7 protocol are divided into functional abstractions called "levels," which map loosely to the Open Systems Interconnect (OSI) 7-layer model defined by the International Standards Organization (ISO). Of particular interest to the invention disclosed herein is the Signaling Connection Control Part (SCCP) level. The SCCP level provides connectionless and connection-oriented network services and Global Title Translation (GTT). A global title is an address (e.g., a dialed 800 number, calling card number, or mobile subscriber identification number) which is translated by the SCCP level into a destination point code (DPC) and, possibly, a subsystem number (SSN); a subsystem number uniquely identifies an application at the destination signaling point. GTT frees originating signaling points from the burden of having to know every potential destination to which they might have to route a message. A switch can originate a query, for example, and address it to an STP along with a request for global title translation. The receiving STP can then examine a portion of the message, make a determination as to where the message should be routed, and then route it. For example, calling-card queries (used to verify that a call can be properly billed to a calling card) must be routed to an SCP designated by the company that issued the calling card. Rather than maintaining a nationwide database of where such queries should be routed (based on the calling-card number), switches generate queries addressed to their local STPs, which, using global title translation, select the correct destination to which the message should be routed. Note that there is no magic here; STPs must maintain a database that enable them to determine to where a query should be routed. Global title translation effectively centralizes the problem and places it in a node (e.g., an STP) that has been designed to perform this function.

In performing global title translation, an STP does not need to know the exact final destination of a message. It can, instead, perform "intermediate global title translation," in which it uses its tables to find another STP further along the route to the destination. That STP, in turn, can perform "final global title translation," routing the message to its actual destination. Intermediate global title translation minimizes the need for STPs to maintain extensive information about nodes which are far removed from them. Global title translation is also used at an STP to share load among mated SCPs in both normal and failure scenarios. In these instances, when messages arrive at an STP for final global title translation and routing to a database, the STP can select from among available redundant SCPs. It can select an SCP on either a priority basis (referred to as primary—backup) or so as to equalize the load across all available SCPs (referred to as "Load sharing").

Figure 3:
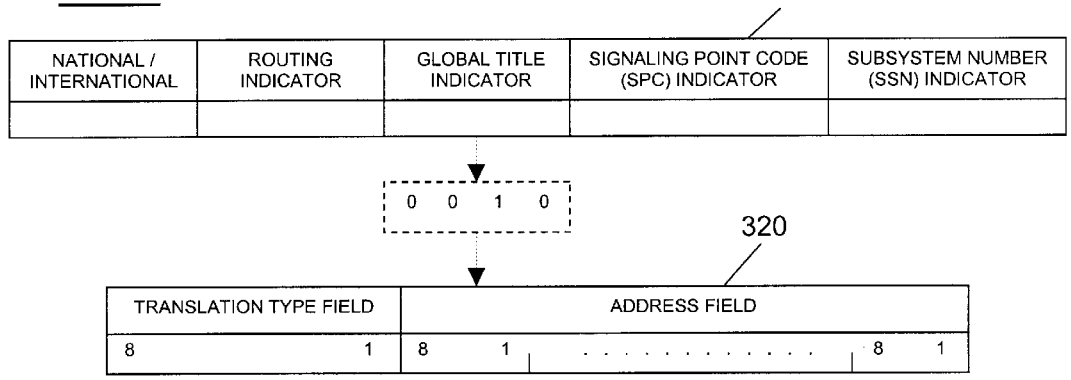
FIG. 3 illustrates portions of signaling messages relating to the process of Global Title Translation (GTT)

Referring now to FIG. 3, illustrated are portions of signaling messages relating to the process of global title translation. A destination address indicator in a signaling message has a format 310, which includes a 4-bit global title indicator. If the global title indicator has the value "0010," then the global title for the destination has a format 320, which includes a one-octet translation type field, and an address field having a variable number of octets as are required to convey the address information.

An example of conventional routing on Global Title, as used in Group Special Mobile (GSM) systems, is the way a Home Location Register (HLR) is queried by a Gateway Mobile-services Switching Center (GMSC) to determine how to route an incoming call to a mobile device. The GMSC sends a signaling message to the HLR (i.e., Send_Routing_Information) using the called party's Mobile Station Integrated Service Digital Network (MSISDN) number as a Global Title. The Global Title allows the message to be routed through the network until it arrives at the HLR where analysis of the Global Title indicates that the message terminates in the HLR. Similarly, a subscriber's International Mobile Subscriber Identity (IMSI) can also be used to reach the HLR by means of routing on Global Title as is done during a location updating procedure.

The present invention recognizes that the Global Title Translation process can be adapted to route messages through the signaling network associated with a PSTN by defining a new translation type that can indicate to the GTT process that the address type to be translated to a DPC, and/or SSN, is an IP address. The new translation type will effectively allow STPs to be used as routers. It is unnecessary to modify the GTT process, which is well known in the art, to implement the present invention; the only difference is that a new translation type must be defined in order to indicate that the input to the GTT process is an IP address.

Turning now to FIG. 4, illustrated is an exemplary flowchart 400 of a conventional GTT process adapted to employ the principles of the present invention. In a Step 410, a data packet is received at a first network node. The first network node may be, for example, an access server on a packet-switched network, such as the Internet, that provides a gateway to a node of a signaling network, such as SS7, associated with a PSTN; alternatively, the data packet may be received directly by a node of the signaling network. In a Step 420, a process in the first network node constructs a message including an address field holding the destination address and a translation type field containing an indicator that the destination address has an address format associated with a packet switched network external to the signaling network, such as the Internet. In a Step 430, the message is then transmitted to a signaling network node where, in a Step 440, the translation type field is examined. If the indicator in the translation type field does not correspond to an address format associated with the packet-switched network, then the message is handled conventionally by A GTT process 445. If the indicator in the translation type field corresponds to an address format associated with the packet-switched network, however, the destination address in the address field is translated, in a Step 450, to a translated destination address corresponding to a destination node of the signaling network; the translated destination address has an address format associated with the signaling network, such as a DPC and/or SSN.

Using the novel GTT translation type allows a signaling network associated with a PSTN, such as the SS7, to be used for routing messages using IP addresses. This can be an advantage, for example, when alternate routing of messages is necessary, such as in the case of LAN or WAN crashes. In addition, the provision of GTT routing on IP based on IP addresses can allow some "native" IP systems to address signaling network nodes using only IP addresses when the nodes are actually only directly reachable via the signaling network; examples of such signaling network nodes of interest include "800/888" databases, SDPs and HLRs.

A potential concern with allowing access to signaling network resources from an external network, such as the Internet, however, is the prevention of malicious activity by unauthorized users. FIG. 5 illustrates an exemplary method 500 for determining a right of access to a signaling network associated with a PSTN. In a Step 510, the packet, or message, received from the network external to the signaling network is examined to determine whether it includes an origination address identifying the sender or sending device. If the message does not include an origination address, the message is either rejected or handled by conventional processing in a Step 520. If the message does include an origination address, however, a right of access to the signaling network, or network resource, associated with the origination address is determined in a Step 530. The right of access can be determined by comparing the origination address with a database of "trusted" addresses.

The method 500 for determining a right of access may be performed by an access server on a packet-switched network, such as the Internet, that provides a gateway to a node of a signaling network, such as SS7, associated with a PSTN; alternatively, the method 500 may be performed by any node of the signaling network, or both. For example, to an access server on the Internet, or a first node of the signaling network, may determine a general right of access to the signaling network, while a right of access to a particular signaling network resource can be determined by each network resource.

Figure 6:
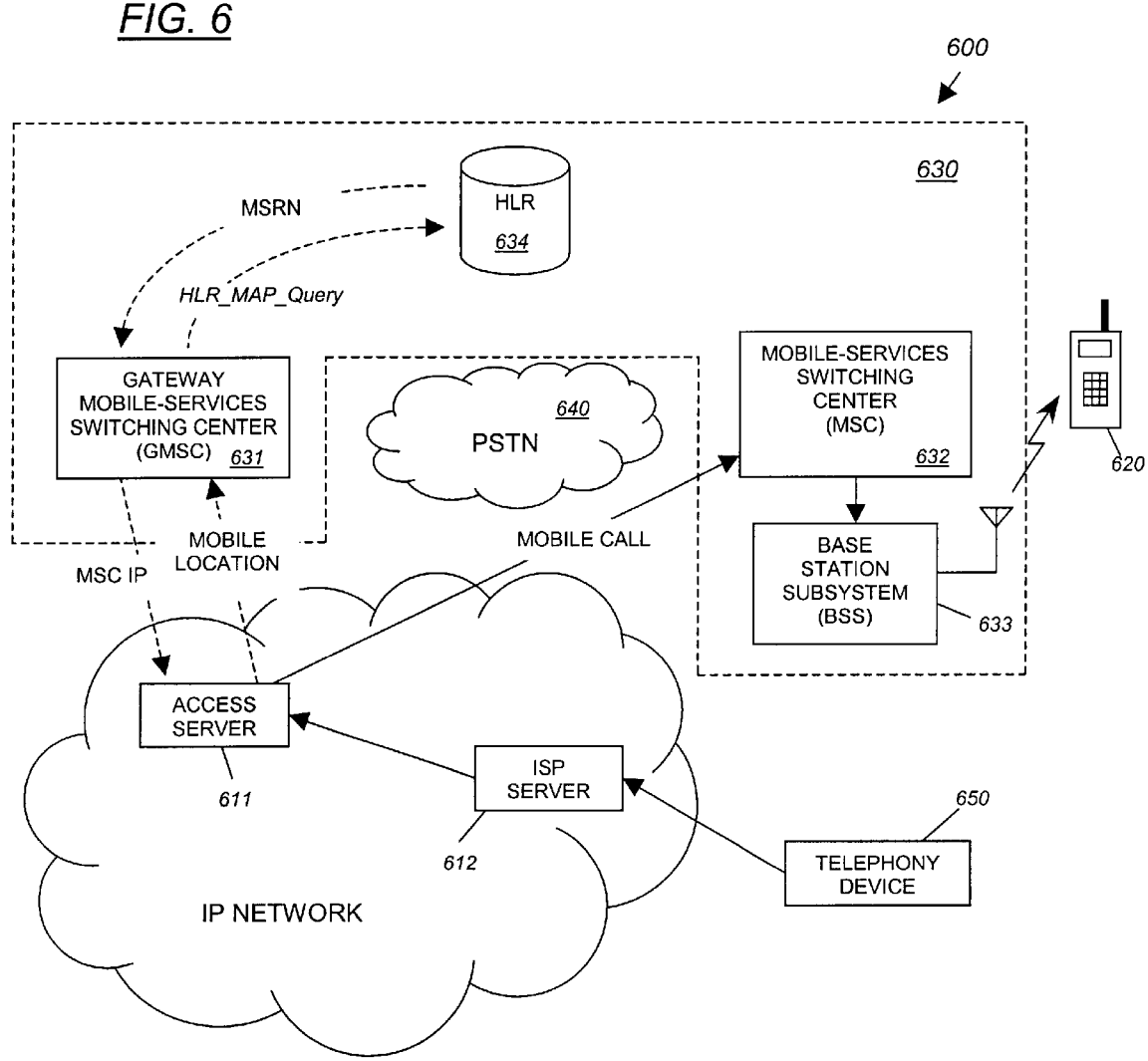
FIG. 6 illustrates an exemplary system and application of the principles disclosed herein.

Finally, FIG. 6 illustrates an exemplary system 600 and application of the principles disclosed herein. A wireless telecommunications network 630, or Public Land Mobile Network (PLMN), conventionally includes a Gateway Mobile-Services Switching Center (GMSC) 631, at least one Mobile-Services Switching Center (MSC) 632 coupled to the GMSC through the Public Switched Telephone Network 640, at least one Base Station Subsystem (BSS) 633 coupled to each MSC 632, and a Home Location Resource (HLR), 634. A packet-switched network 610, such as the Internet, is coupled to a first node, e.g., GMSC 631, of the wireless telecommunications network 630 through an access server 611. A terminal device 650, such as a personal computer having telephony capabilities, is coupled to a server 612, such as a conventional server of an Internet Service Provider (ISP), on the packet-switched network 610.

The current standards supporting IP telephony use two sets of basic mechanisms for establishing communication: IP packet routing for the portion of the transaction which occurs within the IP network (e g., LAN, WAN, Internet), and network routing in the circuit-switched network. This is a reasonable approach when there is a relationship between a called party number and the location of the terminal being called, such as when a phone is connected to an end-office reachable through the PSTN. Even when a subscriber's location is not known, there are cases where such an approach may be justified. For example, a call placed from a telephony device 650 coupled to the Internet 610 can be routed from an Internet Service Provider (ISP) server 612 to an access server 611 that provides a gateway function to a Gateway Mobile-services Switching Center (GMSC) 631 in the called subscriber's home Public Land Mobile Network (PLMN). The call is then routed (not shown) through the circuit-switched PSTN 640 to the Mobile-Services Switching Center (MSC) 632 in communication with the called subscriber's mobile device 620. In a Global System for Mobile Communications (GSM) system, the determination of routing information for a mobile device is accomplished by the GMSC 631 sending a Send_Routing_Information query to the HLR 634. The HLR 634 then sends a Provide_ Routing_Number query to the MSC 632 in communication with the mobile device; the MSC 632 sends a response to the HLR 634, which in turn sends a response to the GMSC 631. Upon receiving the routing information response, the GMSC 631 routes the call through the PSTN 640 to the MSC 632. Thus, the conventional method for routing call requests, such as H.323 calls, from a packet-switched network, such as the Internet, to a mobile device 620 terminates the packet-switched, or IP, segment of the request at the first node, e.g., GMSC 631, of the wireless telecommunications network 630. The remainder of the connection, from the GMSC 631 to the MSC 632, is carried over a circuit-switched network, such as the PSTN 640. This is not an efficient use of network resources because only a negligible quality loss would be incurred by taking the IP traffic all the way to the MSC 632. In addition, because the routing of calls through the PSTN 640 is typically charged to the operator of the wireless telecommunications network 630 or the subscriber of the mobile device 620, the conventional method results in extra transmission expenses either for the operator or subscriber.

Consideration of the conventional procedure for routing IP-based calls to mobile devices raises the question of whether there is a way to optimize transmission paths, especially in view of the current rate differentials for carrying voice across an IP network versus across the circuit-switched PSTN. In fact, this is what is done within GSM under a set of standards known as Support for Optimal Routing (SOR). If there are appropriate agreements in place, a query can be sent to the HLR of the called subscriber and, depending on the outcome of a number of checks, the call can be routed directly to the proper MSC, which can reduce the transmission costs for many calls—a reduction that may be passed along to the subscriber and/or provide an increase in the operating margins for the network operator.

One problem with a direct implementation of the foregoing approach within an IP network, however, is that allowing any IP capable device to generate queries to signaling network resources opens the possibility that through accident or intention, the signaling system and/or HLR could be overloaded with queries, resulting in poor network performance or even network collapse. A solution, based on the principles disclosed herein, is to implement a roaming number gateway or, more appropriately, a Mobile Application Part (MAP) firewall.

First, a network node is required which supports, on one side, a protocol stack using IP. The lower layers could be, for example, Ethernet, SONET, ATM, or SDH; the upper layer could be, and preferably is, TCP. Carried within the payload of a message carried by IP is a request to obtain routing information (or Mobile Location Request) for a particular address; the address could be represented by a MSISDN number or another address which can be translated to an MSISDN either directly or using a database lookup. This is represented in FIG. 6 as a Mobile Location Request sent from access server 611 to GMSC 631, which sends an HLR_MAP_Query to the HLR 634. This query can employ the Global Title Translation on IP address method disclosed hereinabove. The HLR 634 returns the Mobile Subscriber Routing Number (MSRN) to the GMSC 631. The GMSC 631 can translate the MSRN to an IP address (MSC IP) for the MSC 632 in communication with the called party's mobile device 620. Using the MSC IP, the access server 611 can then redirect the call directly to the MSC 632, rather than the call being routed by the GMSC 631 through the PSTN 640.

As described above, it may also be necessary to provide a means to determine a right of access to signaling network resources, such as HLR 634. The process described with reference to FIG. 5 can be implemented in GMSC 631, or access server 611, to determine whether the IP address of telephony device 650 is a "trusted" address; alternatively, a MAC address or a telephone number of the telephony device 650 could be the origination address checked for access rights. If the origination address is not found in a database of trusted addresses, the Mobile Location Request can be logged and rejected; if the origination address is found, however, the request can be allowed and the HLR_MAP_Query can be sent by the GMSC 631 to the HLR 634 through the signaling network.

The present invention provides significant advantages to communications systems, in general, and the invention is particularly advantageous to Internet applications and cellular communications networks. The principles of Global Title routing on IP addresses disclosed herein can optimize the use of network resources and provide a means to increase revenues. Although the principles of the present invention have been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A method for routing a message through a signaling network associated with a Pubic Switched Telephone Network (PSTN), the method comprising the steps of:

constructing a message for transmission to a signaling network node, the message including an address field containing a destination address and a translation type field containing an indicator that the destination address has an address format associated with a packet-switched network external to said signaling network;

transmitting the message to the signaling network node;

examining the translation type field of the message at the signaling network node; and if the indicator in the translation type field corresponds to an address format associated with the packet-switched network, translating said destination address to a translated destination address corresponding to a destination node of the signaling network, said translated destination address having an address format associated with the signaling network.

2. The method recited in claim 1, wherein said address type associated with the packet-switched network is an Internet Protocol address.

3. The method recited in claim 1, wherein said signaling network comprises an out-of-band common channel system.

4. The method recited in claim 3, wherein said signaling network conforms to the Signaling System Number 7 (SS7/C7) standard.

5. The method recited in claim 1, wherein said translated destination address comprises a destination point code (DPC).

6. The method recited in claim 5, wherein said translated destination address further comprises a subsystem number (SSN).

7. The method recited in claim 1, wherein said signaling network node comprises said destination node.

8. The method recited in claim 1, wherein said step of constructing a message for transmission to a signaling network node is performed by a Signal Transfer Point (STP) of said signaling network.

9. The method recited in claim 1, wherein said destination node comprises a Signal Control Point (SCP).

10. The method recited in claim 1, wherein said message further includes an origination address of a node of the packet-switched network.

11. The method recited in claim 10, further comprising the step of determining a right of access to the signaling network associated with said origination address.

12. A system for routing a message through a signaling network associated with a Public Switched Telephone Network (PSTN), the system comprising:

a first node associated with said signaling network for receiving a datagram from a packet-switched network coupled thereto, the datagram including a destination address of a destination node of said signaling network, said destination address having an address format associated with said packet-switched network, said first node operative to:

i.) construct a message including at least a portion of said datagram, an address field containing said destination address, and a translation type field containing an indicator that the destination address has said address format associated with said packet-switched network, and ii.) transmit said message through said signaling network.

13. The system recited in claim 12, further comprising a second node associated with said signaling network, said second node operative to:

i.) receive said message; and, ii.) if the indicator in the translation type field of said message corresponds to the address format associated with said packet-switched network, translate said destination address to a translated destination address corresponding to said destination node of said signaling network, said translated destination address having an address format associated with said signaling network.

14. The system recited in claim 12, wherein said address type associated with said packet-switched network is an Internet Protocol address.

15. The system recited in claim 12, wherein said signaling network comprises an out-of-band common channel system.

16. The system recited in claim 15, wherein said signaling network conforms to the Signaling System Number 7 (SS7/C7) standard.

17. The system recited in claim 13, wherein said translated destination address comprises a destination point code (DPC).

18. The system recited in claim 17, wherein said translated destination address further comprises a subsystem number (SSN).

19. The system recited in claim 13, wherein said second node comprises said destination node.

20. The system recited in claim 12, wherein said first node comprises a Signal Transfer Point (STP).

21. The system recited in claim 12, wherein said destination node comprises a Signal Control Point (SCP).

22. The system recited in claim 12, wherein said message further includes an origination address associated with a node of the packet-switched network.

23. The system recited in claim 22, wherein said first node determines a right of access to said signaling network associated with said origination address.

24. A method for performing global title routing on an Internet Protocol (IP) address, whereby an IP packet can be routed through a signaling network associated with a Public Switched Telephone Network (PSTN), the method comprising the steps of;

receiving an IP packet at a first network node, the IP packet including a destination IP address associated with a destination node of the signaling network;

constructing a message for transmission to a signaling network node, the message including at least a portion of said IP packet, an address field containing said destination IP address associated with said destination node. and a translation type field containing an Indicator that the destination address has an address format associated with said packet-switched network;

transmitting said message to said signaling network node; and translating said destination IP address to a translated destination address corresponding to said destination node of said signaling network, said translated destination address having an address format associated with said signaling network.

25. The method recited in claim 24, wherein said signaling network conforms to the Signaling System Number 7 (SS7/C7) standard.

26. The method recited in claim 24, wherein said translated destination address comprises a destination point code (DPC).

27. The method recited in claim 26, wherein said translated destination address further comprises a subsystem number (SSN).

28. The method recited in claim 24, wherein said signaling network node comprises said destination node.

29. The method recited in claim 24, wherein said first network node comprises a Signal Transfer Point (STP) of said signaling network.

30. The method recited in claim 24, wherein said destination node comprises a Signal Control Point (SCP) of said signaling network.

31. The method recited in claim 24, wherein said IP packet further includes an originating IP address associated with a node of the packet-switched network from which the IP packet originated.

32. The method recited in claim 31, further comprising the step of determining a right of access to said signaling network associated with said originating IP address.

* * * * *